United States Patent [19]

Mabuchi

[11] Patent Number: 4,622,608
[45] Date of Patent: Nov. 11, 1986

[54] CARRIAGE TRAVELING MECHANISM FOR FLOPPY DISC DRIVE

[75] Inventor: Hiroshi Mabuchi, Tokyo, Japan

[73] Assignee: Citizen Watch Co., Ltd., Tokyo, Japan

[21] Appl. No.: 623,726

[22] Filed: Jun. 22, 1984

[30] Foreign Application Priority Data

Jun. 24, 1983 [JP] Japan ............................ 58-114482
Oct. 21, 1983 [JP] Japan ......................... 58-162988[U]

[51] Int. Cl.⁴ .................... G11B 5/55; G11B 21/08
[52] U.S. Cl. ........................................... 360/106
[58] Field of Search ..................... 360/106; 74/89.2

[56] References Cited

U.S. PATENT DOCUMENTS

| | | | |
|---|---|---|---|
| 4,161,004 | 7/1979 | Dalziel | 360/106 |
| 4,170,146 | 10/1979 | Owens | 360/106 |
| 4,399,477 | 8/1983 | Bryer | 360/106 |
| 4,418,370 | 11/1983 | Harrison | 360/106 |
| 4,476,508 | 10/1984 | Tronzano et al. | 74/89.2 |

Primary Examiner—Robert S. Tupper
Attorney, Agent, or Firm—Koda and Androlia

[57] ABSTRACT

A carriage traveling mechanism for a floppy disc drive which includes an α belt, two ends of which are fixed on the carriage and a part of which is wound around a drive shaft, a tension cam supported by the carriage to provide close contact with the α belt in the vicinity of its fixed end, and a tension spring fixed to the carriage to press and urge the tension cam toward the α belt, whereby the requested tension force is regularly provided to both ends of the α belt which are fixed to the carriage.

4 Claims, 6 Drawing Figures

CARRIAGE TRAVELING MECHANISM FOR FLOPPY DISC DRIVE

BACKGROUND OF THE INVENTION

1. Field of the Invention

The present invention relates to a carriage traveling mechanism for a floppy disc drive, and more particularly to an improvement of the traveling mechanism which reciprocally drives the carriage by use of an α belt.

2. Prior Art

As one of the various external data recording media for computers there has been known a so-called floppy disc which includes a planer flexible plastic sheet having one or both sides coated with electro-magnetic recording layers and which is increasingly used over a wide range of applications because of its various advantages such as low price, ease of handling, the possibility of random access, etc. as compared with conventional hard discs.

In order to write and read the data to and from the floppy disc, a floppy disc drive is used in which the floppy disc is rotated at a high speed and a head is closely positioned on the requested track. Therefore, it is necessary that a carriage carrying the head be driven and transferred with high accuracy in order to quickly and firmly move the head to the requested track.

In the prior art devices the carriage is moved by a screw or belt. In recent years, however, there has been utilized a carriage traveling mechanism in which a part of a belt is wound around a drive shaft with both ends of the belt fixed to the carriage and the rotation of the drive shaft is converted into the reciprocation of the carriage. This device has been know as an α belt drive since the belt is mounted around the drive shaft in an α shape.

According to the α shape drive mentioned above, a guide pulley which is separately prepared other than the drive shaft of the belt traveling mechanism in the prior art device can be omitted. Therefore, the drive shaft and the carriage can be closely arranged and the mechanism has the advantage of being designed to be small in size.

In the conventional α belt feeding mechanism, however, the belt is loosened by stretching caused by temperature fluctuations which remarkably decrease the accuracy of carriage feeding and affect the accuracy of read and write action.

Furthermore, in the prior art devices, oscillation is easily generated in the belt itself during carriage movement and the read and write operations must be delayed until the oscillation mentioned above decreases after the head is positioned on the track to which the head is required to be positioned. Therefore, in the prior art devices, the belt is assembled in a state with a desired pre-tension or the belt is fixed to the carriage with an end of the belt connected to a spring. In the former case several troublesome operations are required in its assembly and the belt is easily broken; and in the latter case it is hard to obtain stable tension. Moreover, in the prior art devices, both ends of the belt mentioned above are fastened to belt receiving portions provided on the carriage by spot welding, screwing, riveting or the like. Screwing and the riveting are troublesome fastening operations and spot welding does not provide accurate positioning in the reciprocal slides of the carriage.

SUMMARY OF THE INVENTION

Accordingly, it is a general object of the present invention to provide an improved carriage traveling mechanism for a floppy disc drive in which an α belt is regularly extended with desired tension whereby the oscillation of the belt can be quickly decreased and head positioning can be peformed with high accuracy.

Furthermore, it is another object of the present invention to provide an improved carriage traveling mechanism for a floppy disc drive in which the carriage traveling belt can be easily fastened to a belt receiving position on the carriage as well as a carriage which can be reciprocally slid to a necessary position with high accuracy.

In keeping with the principles of the present invention, the objects are accomplished via a carriage traveling mechanism for a floppy disc drive which includes an α belt, both ends of which are fixed at the carriage and a part of which is wound around a drive shaft, a tension cam supported by the carriage to provide close contact with the α belt in the vicinity of its fixed end, and a tension spring fixed to the carriage to press and urge the tension cam toward said belt, whereby the required tension force is regularly provided to the α belt whose two ends are fixed to the carriage.

Another object of this invention is accomplished with a fixing mechanism in the two end portions of the carriage traveling belt which is fixed to the belt mounting portion provided on the carriage and which transfers to a desired track on the floppy disc by a drive pulley, which includes a lock pin fixed to one end of the carriage traveling belt and having a head portion on its tip end, a guide hole provided in the belt mounting portion to receive the lock pin, and an anchor spring portion provided on the belt and having a pointed end in the vicinity of the guide hole, whereby one end of the carriage traveling belt is fixed in such a way that the lock pin is inserted through the guide hole and the pointed end of the anchor spring portion engages with the head portion of the lock pin projecting from the guide hole.

DETAILED DESCRIPTION OF THE INVENTION

Referring more particularly to the drawings, shown therein is a principal portion of a carriage assembled in a floppy disc drive. The carriage 10 is slidingly supported by two rail guides 12 and 14 arranged in parallel to each other on a base of the floppy disc drive (not shown), and a read/write head, not illustrated in detail, is fixed to a gimbal spring 16 which is attached to the left end of the carriage 10 in FIG. 1.

Figure 1:
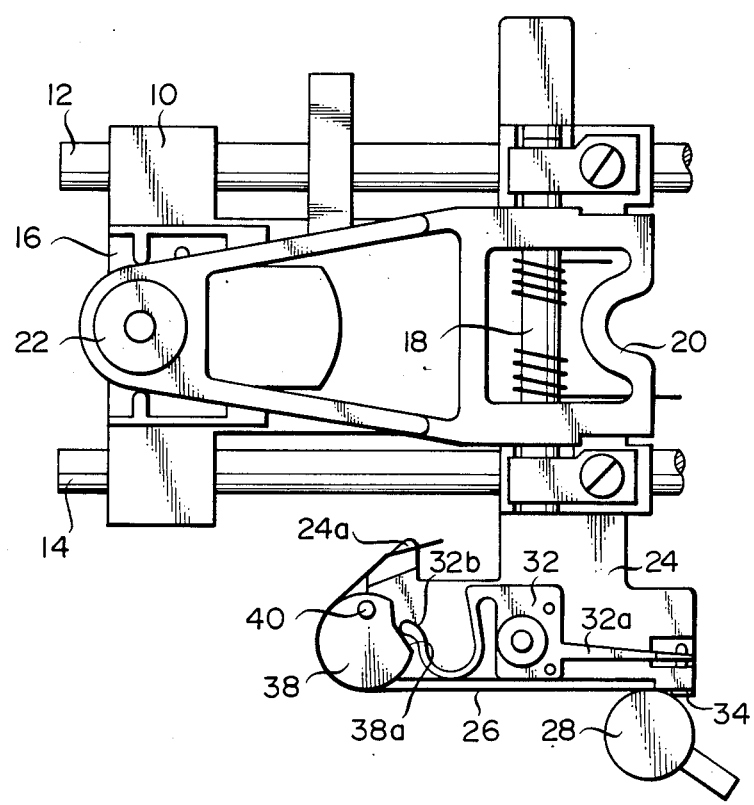
FIG. 1 is a plan view of a principal portion of a carriage traveling mechanism in accordance with the teachings of the present invention.

An arm shaft 18 is fixed on the right side of the carriage 10 in FIG. 1, and it pivotally supports an arm 20 on which a pad 22 is attached to closely press the floppy disc, not illustrated, to the head mentioned above.

In FIG. 1 the carriage 10 includes a belt mounting portion 24, both ends of which respectively receive and support the corresponding two ends of α belt 26.

Figure 2:
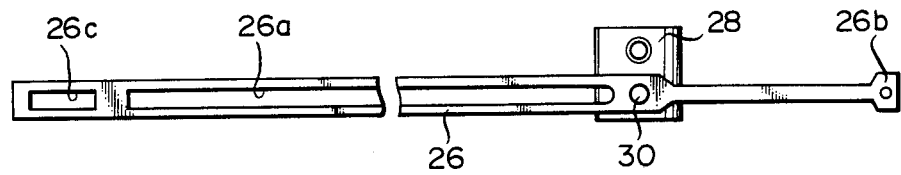
FIG. 2 is a front view of a carriage traveling α belt provided in the carriage traveling mechanism of FIG. 1.
Figure 3:
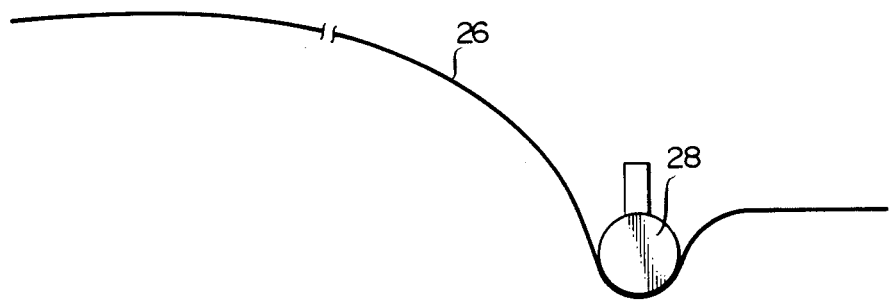
FIG. 3 is a plan view of the α belt with both ends extending freely from the drive shaft.

The intermediate portion of the α belt 26 is tightly fixed to a pulley 28 by a pin 30 as shown in FIGS. 2 and 3. The belt 26 has a narrow portion extending from the fixed end 26b thereof at one side (the right side in FIG. 2), and a groove 26a is formed in the center of the widened portion of the belt 26 extending to the other side (the left side in FIG. 2). Accordingly, since the narrow belt portion can freely pass through the inside of the groove 26a, it is understood that the α belt 26 is wound around the pulley 28 and rotation of the pulley 28 extends the belt 26 on one side and retracts the belt 26 on the other side.

Figure 4:
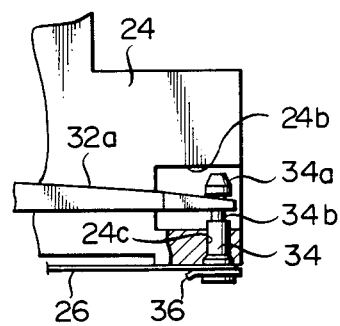
FIG. 4 is an enlarged top view of a principal portion showing a supporting structure of one end of the α belt in FIG. 1.

The α belt 26 is fixed at one end 26b to the right end of the belt mounting portion 24 by an anchoring mechanism as shown in FIG. 4, and is hooked at the other end to an anchoring pawl 24a formed on the other end of the of the belt mounting portion 24 by a hook groove 26c so that the α belt can be connected to the carriage 10.

FIG. 4 shows a structure in which one end 26b of the α belt 26 is fixed to the belt mounting portion 24 by one simple action. In this structure, a belt supporting spring 32 is fixed to the belt mounting portion 24. The belt supporting spring 32 is fixed to the belt mounting portion 24. The belt supporting spring 32 includes an anchor spring portion 32a formed on its one end, and the pointed end of the anchor spring portion 32a is engaged with a lock pin 34 fixed on one end of the α belt 26. In other words, the lock pin 34 is fixedly attached to one end of the α belt 26 through a washer 36 by caulking or the like, and includes a tapered tip portion 34a on its top end and a neck portion 34b joined to the tapered tip portion 34a. On the other hand, the belt mounting portion 24 includes a recess 24b and an aperture 24c which extends toward the recess 24b, and the lock pin 34 is freely inserted through the aperture 24c.

In FIG. 4 the tip portion of the lock pin 34 which is fixedly attached to the one end of the α belt 26 protrudes into the recess 24b, and the neck portion 34b is engaged with the pointed end of the anchor spring portion 32a with an upward tension force. Accordingly, in such an engaging state, one end of the α belt 26 is firmly connected to the belt mounting portion 24. The α belt 26 may be removed from the belt mounting portion 24 by simply lifting the anchor spring portion 32a without the necessity of removing any material.

The other end of the α belt 26 can be anchored simply by hooking the hook groove 26c to the anchor pawl 24. Under such conditions, however, the α belt 26 may be loosely connected to the carriage 10, and reciprocation of the pulley 28 cannot be effected with the desired positional accuracy.

In the present invention, the α belt 26 can be properly spanned over to the carriage 10 by applying tension force to the α belt 26 after it has been connected to the carriage 10. In order to do this, a tension cam 38 consisting of a nearly circular plate is swingably supported on the belt mounting portion 24 by a shaft 40 in the vicinity of its circumference, and a groove 38a of the tension cam 38 receives the tension force from a tension spring 32b formed on the other end of the belt supporting spring 32. Thus, the tension cam 38 regularly applies tension force to the α belt 26 so that the belt 26 can be pushed outwardly and the belt can be regularly tensioned to a predetermined level after assembly. Therefore, according to the structure in the embodiment described hereinabove, the tension on the belt 26 or the carriage 10 may be effectively compensated for with respect to any possible error due to stretching caused by temperature fluctuations, the passage of time, or the like.

Figure 5:
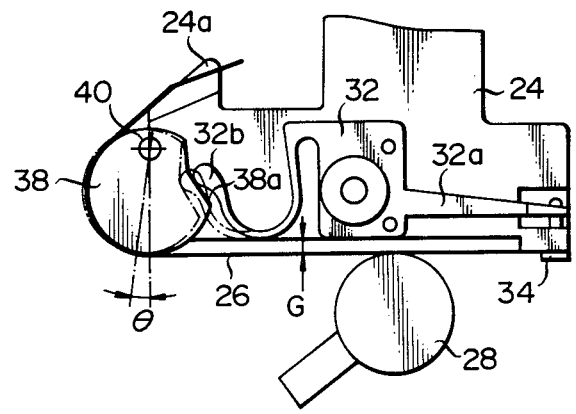
FIG. 5 is a plan view illustrating the operation of the this embodiment.

FIG. 5 shows the stretch compensating action of the α belt 26 in this embodiment. When the α belt 26 stretches, the tension cam 38 slightly swings clockwise an angle θ from the position shown by the thick line by the tension force of the tension spring 32b with the shaft 40 as the center, and stretching of the α belt 26 is absorbed as shown in the chain line in the figure.

Furthermore, in this embodiment, since the supporting position of the tension cam 38 is established so that the normal line to the α belt 26 can be through the center of the shaft 40, little change is made in the distance between the α belt 26 and the carriage 10; that is, the gap G enables the carriage traveling accuracy to be set constant, as shown in FIG. 5, when the tension cam 38 swings a certain angle.

Figure 6:
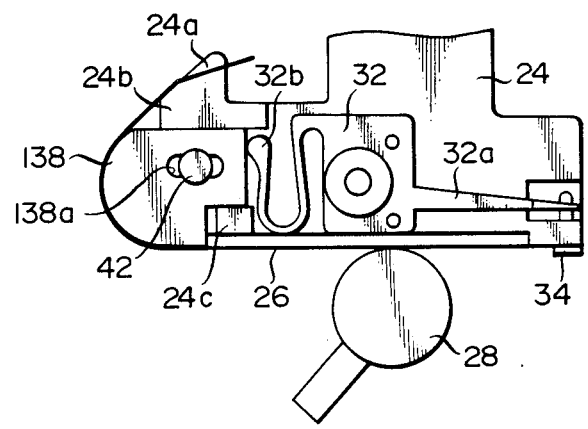
FIG. 6 is a plan view of a principal portion of another preferred embodiment showing the carriage traveling mechanism in accordance with the teachings of the present invention.

FIG. 6 shows another embodiment of the carriage traveling mechanism in accordance with the teachings of the present invention. Like elements in the embodiment described herein below are denoted by like numerals, and their description will be omitted.

This embodiment is characterized in that a tension cam 138 is slidingly coupled to the carriage 10 to extend the α belt 26. Furthermore, the tension cam 138 is slidingly supported by slide guides 24b and 24c provided on the belt mounting portion 24, and is further supported by the carriage by means of engagement of the pin 142 with long opening 138a.

Also, in this embodiment the tension cam 138 always provides tension to the α belt 26 in the extending direction via the tension spring 32b and stretching of the belt 26 or oscillation of the belt 26 can be firmly absorbed.

As described above, according to the present invention, in a small type carriage traveling mechanism using an α belt, stretching of the α belt can be firmly absorbed and a decrease in carriage traveling accuracy caused by temperature fluctuations can be prevented. Furthermore, since oscillation in the carriage during travel can be effectively absorbed by tension force of the tension cam, the head can be quickly positioned at the required position and the read/write speed of the floppy disc can be increased.

What is claimed is:

1. A carriage traveling mechanism for a floppy disc drive comprising:
    an α belt, two ends of which are fixed at the carriage and a part of which is wound around a drive shaft;
    a tension cam supported by the carriage in close contact with said α belt in the vicinity of one of its fixed end; and
    a tension spring fixed to the carriage urging said tension cam toward said α belt,
    whereby the required tension force is regularly provided to said belt.

2. A carriage traveling mechanism for a floppy disc drive according to claim 1, wherein said tension cam consists of a nearly circular plate rotatably mounted on the carriage.

3. A carriage traveling mechanism for a floppy disc drive according to claim 1, wherein said tension cam consists of a slide cam slidably mounted on the carriage.

4. A carriage traveling mechanism for a floppy disc drive according to claim 1, 2, or 3, wherein a fixing mechanism for one end of the belt comprises:

a lock pin fixed to the one of said belt and having a head portion on its tip portion;

a guide hole in the carriage to receive said lock pin; and an anchor spring portion formed on the tension spring and extending its pointed end to the vicinity of said guide hole, whereby the one end of the carriage traveling belt is fixed when said lock pin is inserted through said guide hole and the pointed end of said anchor spring portion is engaged with the head portion of said lock pin.

* * * * *